No. 621,370.  
J. W. PERRY.  
PNEUMATIC DEVICE FOR BICYCLES OR VEHICLES.  
(Application filed Oct. 5, 1898.)
(No Model.)
Patented Mar. 21, 1899.
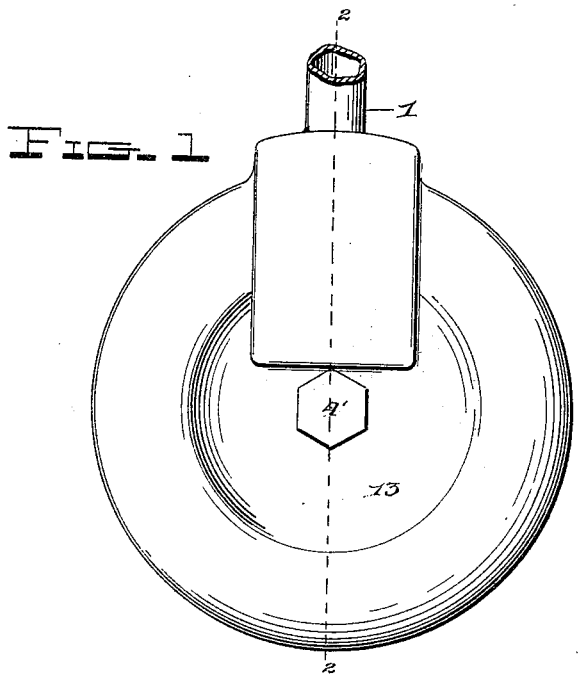
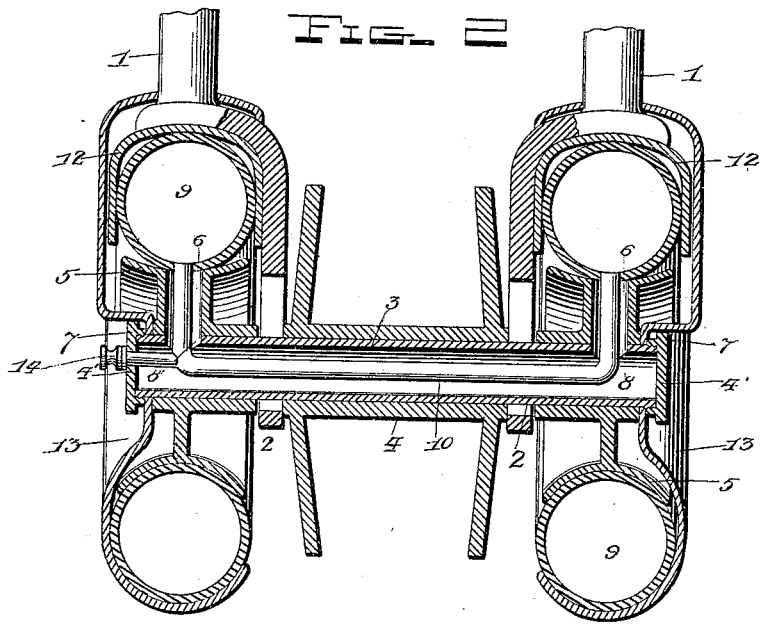
Witnesses  
Inventor  
James W. Perry,  
by H. B. Willson & Co  
Attorneys

UNITED STATES PATENT OFFICE.

JAMES W. PERRY, OF SHAMOKIN, PENNSYLVANIA.

PNEUMATIC DEVICE FOR BICYCLES OR VEHICLES.

SPECIFICATION forming part of Letters Patent No. 621,370, dated March 21, 1899.

Application filed October 5, 1898. Serial No. 692,688. (No model.)

*To all whom it may concern:*

Be it known that I, JAMES W. PERRY, a citizen of the United States, residing at Shamokin, in the county of Northumberland and State of Pennsylvania, have invented certain new and useful Improvements in Pneumatic Devices for Bicycles or Vehicles; and I do declare the following to be a full, clear, and exact description of the invention, such as will enable others skilled in the art to which it appertains to make and use the same.

My invention relates to a pneumatic axle-bearing for bicycles or vehicles; and the object is to provide a pneumatic bearing for the hub and axle in lieu of the exposed pneumatic tire.

To this end the invention consists in the construction, combination, and arrangement of the device, as will be hereinafter more fully described, and particularly pointed out in the claims.

In the accompanying drawings the same reference characters indicate the same parts of the invention.

Figure 1 is a side elevation of the rear portion of a bicycle-frame embodying my invention. Fig. 2 is a vertical transverse section on the broken line 2 2.

1 1 denote the forks, the lower ends of which terminate in the slotted heads 2 2 to receive the tubular axle 3, on which the hub 4 is mounted.

5 5 represent bearing-drums mounted on the outer ends of the tubular axle 3 3 and held in place by the cap-nuts 4' 4'. The rim 5 of each drum is semicircular in cross-section, and from one point in the rim a tubular spoke or arm 6 extends through the drum-hub 7 and communicates with a radially-alined orifice 8 in the axle.

9 9 represent annular pneumatic bearing-rings which encompass the drums, and they are connected by a communicating-tube 10 to equalize the pressure in the two rings.

12 12 represent U-shaped bearing-plates fixed to the lower ends of the forks and forming a bearing for the upper face of the pneumatic rings.

13 13 denote sheet-metal guards or cages secured to the axle by the cap-nuts 4' 4' and encompassing the lower end of the forks, the drums, and the pneumatic rings.

14 denotes the valved nipple communicating with the tube 10 and by means of which the bearing-rings are inflated.

A bearing of this construction has the same effect in practice as a pneumatic tire without its objections.

Although I have specifically described the construction and relative arrangement of the several elements of my invention I do, not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A pneumatic axle-bearing for vehicles, comprising the axle 3, the slotted forks 1 1, adapted to encompass said axle, the drums 5 5 mounted on said axle, and the pneumatic rings 9 9 arranged between the drums and forks, substantially as shown and described.

2. A pneumatic axle-bearing for vehicles, comprising the tubular axle 3, the slotted forks 1 1 encompassing said axle, the U-shaped bearing-plates 12 12 fixed to said forks, the curved rim-drums 5 5 mounted on said axle and the pneumatic rings encompassing said drums and connected by the tube 10, substantially as shown and described.

In testimony whereof I have hereunto set my hand in presence of two subscribing witnesses.

JAMES W. PERRY.

Witnesses:
BENJ. W. HAUPT,
URIE LEE GORDY.